United States Patent [19]

Garwin et al.

[11] Patent Number: 4,745,565

[45] Date of Patent: May 17, 1988

[54] CALIBRATION OF A FORCE SENSING TYPE OF DATA INPUT DEVICE

[75] Inventors: Richard L. Garwin, Scarsdale; James L. Levine, Yorktown Heights, both of N.Y.

[73] Assignee: International Business Machines Corporation, Armonk, N.Y.

[21] Appl. No.: 821,177

[22] Filed: Jan. 21, 1986

[51] Int. Cl.[4] .............................................. G08C 21/00
[52] U.S. Cl. .................................. 364/571; 364/558; 178/18; 73/862.04
[58] Field of Search ............... 364/571, 556, 558, 190; 178/18; 73/862.04, 1 R

[56] References Cited

U.S. PATENT DOCUMENTS

| | | | |
|---|---|---|---|
| 3,657,475 | 4/1972 | Peronneau et al. | 178/18 |
| 4,121,049 | 10/1978 | Roeber | 178/18 |
| 4,192,005 | 3/1980 | Kurtz | 364/558 |
| 4,340,777 | 7/1982 | DeCosta et al. | 178/18 |
| 4,352,159 | 9/1982 | Colby | 364/571 |
| 4,355,202 | 10/1982 | DeCosta et al. | 178/18 |
| 4,389,711 | 6/1983 | Hotta et al. | 364/556 |
| 4,435,616 | 3/1984 | Kley | 178/18 |
| 4,511,760 | 4/1985 | Garwin et al. | 178/18 |
| 4,514,688 | 4/1985 | Whetstone | 178/18 |
| 4,575,581 | 3/1986 | Langberg | 178/18 |
| 4,598,381 | 7/1986 | Cucci | 364/571 |
| 4,650,926 | 3/1987 | Nakamura et al. | 178/18 |

FOREIGN PATENT DOCUMENTS 1528581 10/1978 United Kingdom .

OTHER PUBLICATIONS

ANL-80-74 User Guide for Minpack-1, J. J. More et al., Aug. 80, Argonne National Laboratory, Argonne, IL.

Primary Examiner—Parshotam S. Lall
Assistant Examiner—Daniel W. Juffernbruch
Attorney, Agent, or Firm—John J. Goodwin

[57] ABSTRACT

The calibration of a force sensing type data input device through the use of at least one correction developed by minimization of differences between an actual location of a pattern of test forces and a calculated location of the test forces where the calculation is on the basis of the effect of the test forces on the equilibrium of the device.

3 Claims, 1 Drawing Sheet

CALIBRATION OF A FORCE SENSING TYPE OF DATA INPUT DEVICE

DESCRIPTION

1. Technical Field

The technical field of the invention is that of devices for the entry of data into a computer system, wherein the location, in a work area, of an applied force, is employed as data in a computer system. The work area is usually the face of a display and the force is usually applied through the user's finger or by means of a stylus.

In one example of this type of data entry device, the user presses a finger against the face of the display and the position of the finger is determined by signals developed from transducers that detect the magnitude of the force with respect to each transducer and, in turn, the location of the force in the work area. The transducers, in some constructions support a separate transparent plate positioned between the user and the display. In other constructions, they may be the supporting members of the display itself.

Force sensing data input devices provide a direct way for a user to interact with information in a computer and are of particular use when the interaction is with displayed information.

2. Background Art

In U.S. Pat. No. 3,657,475 a force receiving plate having rigidity with respect to bending is fixed to a display surface by at least three, spaced apart, sensors. The outputs of the sensors, mounted between the plate and a rigid support, are electronically processed to determine the position of the user's finger. The sensors may be piezoelectric elements which produce an output which is proportional to the magnitude of the applied force.

In U.S. Pat. No. 4,121,049 the force receiving plate is fastened to the display with long semicircular springs on which strain gauges are mounted.

Some of the problems encountered as the art developed were addressed in U.S. Pat. Nos. 4,340,777 and 4,355,202 wherein the force receiving plate is mounted on pointed sensing members.

In U.S. Pat. No. 4,511,760 a problem involving the effect of tangential forces on the force receiving plate is addressed by performing the force locating computation at the time when the pressure is released after each sensor has sensed the maximum pressure.

In apparatus of this type in the quest for precision as the requirements become more stringent, fluctuations in output due to noise in the force detectors and the fact that the outputs of some force detectors in the quiescent or untouched state may have a signal called an "offset signal", need to be taken into consideration.

In British Pat. No. 1528581 a summing circuit is employed which provides a detection that the force applied is greater than a certain value so as to exclude minor output variations such as detector noise.

In U.S. Pat. No. 4,389,711 a system is provided that senses that no external force is applied. The system further places noise and no-load or offset transducer conversion factors in a memory, for use in force location computation.

There is a need in the art, in order to improve precision, to be able to accommodate signal variation factors that come from the way the sensors are mounted, the signals from the sensors, and, the way the force is applied.

DISCLOSURE OF THE INVENTION

The invention provides, in a force sensing type data input device, a calibration that will correct for variations in both sensitivity and position of the force transducers.

This is accomplished in accordance with the invention by applying a known pattern of data input type forces to the device, calculating the location of each force in the pattern employing information from the force responsive signal from each sensor and performance information on each sensor, determining the difference between the calculated location and a known location of each force in the pattern and developing corrections which may be employed for each force being sensed when the device is in service or may be employed to reposition the force sensor.

The calibration of the invention may be performed with the device fully assembled and in normal working order.

Figure 1:
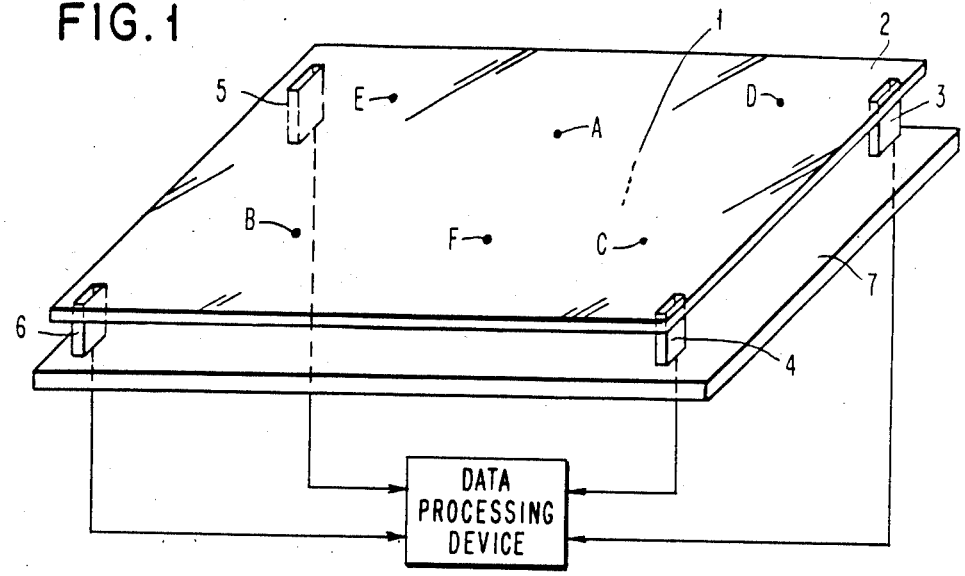
FIG. 1 is a three-dimensional schematic view of a force sensing type of data input device where the force receiving plate is mounted on four sensors.

As the accuracy requirements for the ability to locate a force in the work area 1 for the type of device of FIG. 1 increase, a number of considerations become involved. The flexing of the plate 2 can affect the ability to precisely locate the applied force. If the plate 2 were made thicker to minimize flexing, visual parallax on the part of the viewer in looking through the plate would be increased. Supporting the plate 2 on a greater number of transducers assists the bending situation but introduces manufacturing complexity.

The invention provides calibration information that is independent of the considerations of flexing of the force receiving plate and accommodates unique output signals of individual transducers and of any unique application of force by the user.

Referring to FIG. 1, a schematic view is provided of a force sensitive type data input device wherein, over a work area 1, which may be the screen of a cathode ray tube, there is mounted a force receiving plate 2, supported by force transducers 3-6, each in turn being attached to the display surface or to a supporting reference member 7. The force receiving plate 2 is usually transparent so that any displayed information in the work area 1 can be viewed through the plate 2 and selected or modified by applying a force, such as by pushing on the plate 2 in proximity to the desired information. The force sensors 3-6 are preferably piezoelectric transducer devices which provide a voltage or current output in response to an applied force. Other types of transducers providing a parameter that varies in response to force that can serve as an output signal may be used. Although four force sensors are shown, any number greater than two may be used.

A plurality of data input test forces is applied to the force receiving plate 2. Each test force is at a known location. The number of the plurality is at least equal to one-half the quantity three times the number of force sensors minus 1. A pattern of test force locations is shown in FIG. 1 as A . . . F. The number of test forces applied at locations A .... F is established by the facts that there are four force sensors 3, 4, 5 and 6, then half the quantity, three times four minus 1, would be five and a half which would be rounded up to the six, A ... F, shown in FIG. 1.

In accordance with the invention, the location of each of the test forces that is applied at A ... F is calculated with respect to the effect of that test force on the equilibrium of the force sensing plate 2, with correction for unique offset or no-load signals from each individual force sensor of the force sensors 3 ... 6. The calculated location is based on an assumed location and sensitivity of each force sensor. A comparison is made with the actual location of the test force. The result of the comparison is a difference between the calculated and the actual location of each test force. When all applied test force locations have been calculated, compared and differences established, the result will be a list of differences. The assumed locations and sensitivities of the force sensors are then varied until a minimized difference value is developed. The adjusted locations and sensitivities are then employed when the input device is in service.

Cartesian coordinates which provide x,y addresses are employed for convenience.

The calculated location of an individual data input force or "push" in the pattern of test forces employed in the invention is obtained by calculating the location of the "push" using the effect of the push on general equations of equilibrium.

The general equations of equilibrium may be stated as follows:

Let a force F be applied to a surface such as the plate 2 at cartesian coordinates (X,Y). The N transducers, corresponding to elements 3-6 in FIG. 1, may be labelled by an integer i (i=1, 2 ... N) with the i'th force sensor being located in an arbitrary reference grid at coordinates (XT(i), YT(i)). So that under such labelling, the reaction force from the i'th force sensor would be -FR(i). When the "pushes" are essentially perpendicular, any horizontal component will be negligible and the torques $M_x$ and $M_y$ around the X and Y axes, respectively, as well as the total forces on the plate 2 must balance. Thus, three general equilibrium force equations for $M_x$, for $M_y$ and for the force may be expressed as shown in equations 1, 2 and 3.

$$M_x = \sum_i FR(i)XT(i) \quad \text{Eq. 1}$$

$$M_y = \sum_i FR(i)YT(i) \quad \text{Eq. 2}$$

$$F = \sum_i FR(i) \quad \text{Eq. 3}$$

The force sensor output signals, usually voltage signals, expressed as V(i), and the forces FR(i) in equations 1-3 are obtained in terms of a transduction factor TF(i) for each sensor in accordance with equation 4.

$$FR(i) = TF(i)V(i) \quad \text{Eq. 4}$$

The transduction factors TF(i) are empirical factors that combine both the efficiencies of the transducers or force sensors and the gains of any amplifiers used in connection therewith.

By combining equations 1, 2, 3 and 4, the "push" or data input force location may be obtained in accordance with equations 5 and 6.

$$X = \sum_i V(i)TR(i)XT(i) / \sum_i TF(i)Vi \quad \text{Eq. 5}$$

$$Y = \sum_i V(i)TF(i)YT(i) / \sum_i TF(i)Vi \quad \text{Eq. 6}$$

The accuracy with which X and Y in equations 5 and 6 can be computed is dependent on the accuracy with which the values of the locations of the transducers XT(i), YT(i) and TF(i) are known, or can be measured.

In practicing the invention, care is required in several places. Since even when they are mounted accurately at known positions, the transducers themselves have non-zero dimensions so that the exact location at which the reaction force is applied may be uncertain.

The values of TF(i) also require precision. One method of obtaining values of TF(i) would be to calibrate each transducer and amplifier before assembly by applying a known force to each and measuring the voltage at the output of its amplifier. Such a record of each transducer, amplifier and calibration would then have to be retained throughout the manufacturing process and possibly for the lifetime of the product.

While it is theoretically possible to establish values of the factors TF(i) by applying a "push" at a known place, calculating the expected forces FR(i) in equations 1, 2 and 3, and then measuring the actual transducer voltages V(i), such a calculation of expected forces, where there are more than three transducers requires taking into consideration the flexural properties of the plate 2 and the mechanical properties of the transducers 3-6 and their supports because such a problem is statically indeterminate with more than three supports and in most practical applications of force sensing types of data input devices, four or more transducers will be needed for adequate support. Therefore, this theoretical technique cannot be used.

In accordance with the invention, a plurality of test data type input forces or pushes are applied at a number of locations such as the six locations shown as A, B, C, D, E and F in FIG. 1.

The magnitude of the test forces or pushes, within practical ranges, need not be controlled. The locations of the pushes with respect to one another must be known, such as would be achieved with a simple template with marked positions corresponding to specific coordinates. The template would be positioned on the plate 2 with locations A ... F indicated.

After pushing at each of the positions A ... F, a calibration correction factor is developed from the difference in location of each test push from the known location for use in all calculations of coordinates when the force sensing data input device is in use and for positioning force sensors.

The general goal in the calibration is to provide values for the individual sensor coordinates and sensitivities so that the calculated coordinates of the calibrating pushes agree well with the prescribed coordinate pairs. Values that depart from the best parameter values will not fit the calibrating pushes so well, and will give less accurate x,y pairs for pushes in actual use. This general goal of best fit to the calibrating pushes is achieved by varying assumed parameters until the minimum difference is found in the global misfit between calculated coordinates and prescribed coordinates. A measure of misfit is prescribed and then an efficient algorithm embodied in a computer program is used automatically to vary the parameter set until an adequately small and minimum difference is obtained. One preferred measure of minimum difference is the sum of the squares for the difference between the calculated and prescribed x coordinates for each calibrating push, plus a corresponding sum of the squares of the y-coordinate differences. Older algorithms would, for instance, make small steps in parameter space in the direction of the negative gradient or slope of the "error surface", but, since, the "error surface" is usually determined by the actual parameter variation, quite small steps are necessary, and this leads to long computing times. Still other approaches would include an analytic expansion of the "error surface" in the neighborhood of assumed parameter values, so that linear least square type methods may be applied. General non-linear methods have been found to be more convenient, since they allow also more general definitions of the measure of misfit, for instance, to minimize the maximum discrepancy, or to minimize the sum of the squares of the discrepancies, while still allowing the automatic exclusion of the calibration push with largest discrepancy.

Major advantages of the calibration of the invention are that calibration can occur after the device is fully assembled; transducer locations and sensitivities are empirically determined thereby eliminating any need for control during manufacture; and the calibration can be repeated at any later time without disassembling the device in case the calibration should change, the original data be lost, or in case a different coordinate system were to become necessary, such as could occur due to damage or aging of associated display circuitry.

A further advantage of the invention is that equations 5 and 6 produce values that are independent of the mechanical properties of the transducers 3–6 and the flexural properties of the plate 2. Therefore, if these properties were to change during the life of the device, there will be no loss of precision.

BEST MODE FOR CARRYING OUT THE INVENTION

The preferred method of carrying out the invention involves the interdependent determination of relative push positions by equilibrium calculations and the development of the correction factor by minimization through a least squares technique.

The following notation is employed. For each transducer labeled by an integer i there are 3 unknowns. These are its sensitivity TF(i) and its location coordinates XT(i) and YT(i).

Since the information involved in the calibration will be made up of pluralities of forces, coordinates and signal values, the tabular form is employed for convenience. The transducer properties are listed in Table I.

TABLE I

| Transducer Properties | |
|---|---|
| Transduction Factors | TF(1), TF(2), . . . TF(N) |
| X Coordinates | XT(1), XT(2), . . . XT(N) |
| Y Coordinates | YT(1), YT(2), . . . YT(N) |

Figure 2:
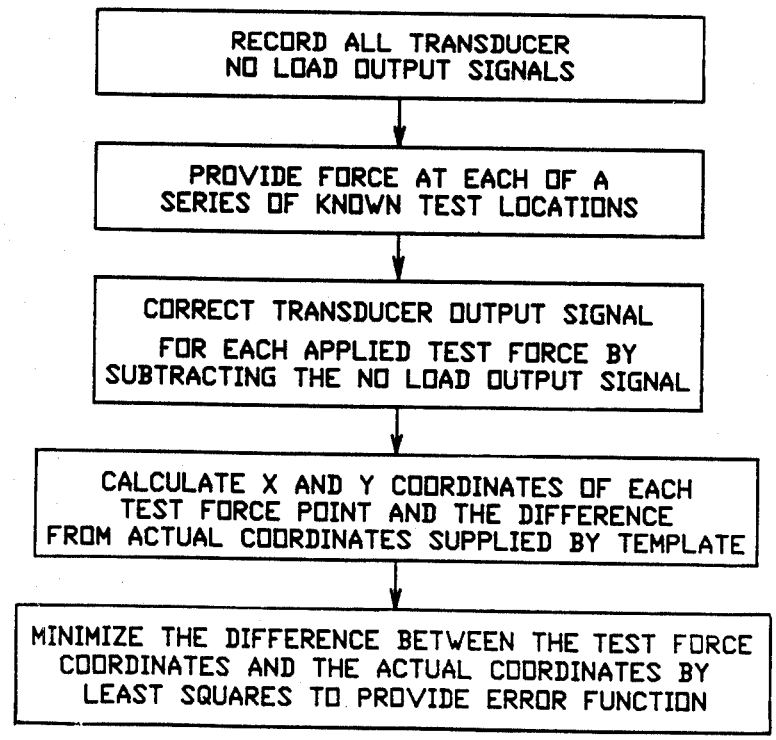
FIG. 2 is a flow chart of the steps involved in the calibration of the invention.

Referring now to FIG. 2, a flow chart is provided describing the steps employed in the calibration.

In the first step, the sensor output signals, usually voltages, are measured without any applied force. The signal may be from the sensor or the combined sensor and amplifier so long as consistent. It is preferred that the combination of the sensor and amplifier be employed. Any non-zero value that is measured is the "offset error" or no-load signal. The value is stored, and algebraically subtracted from all subsequent measurements to eliminate the signal. This no-load or "offset error" signal of amplifier i is referred to as VO(i).

Continuing in FIG. 2, in the second step, data input type test forces or pushes are applied at a plurality K of locations in a pattern chosen so that the pushes are spread over a large portion of the plate 2 area. The relative locations of the pushes must be known accurately as would be achieved using a template with points that were to correspond to A, B, C, D, E and F. The pushes may be identified by an integer such as j (j=1,2 ... K) and using such a description the coordinates would be tabulated in Table II.

TABLE II

| Push Locations | |
|---|---|
| X Coordinates: | XP(1), XP(2), . . . XP(K) |
| Y Coordinates: | YP(1), YP(2), . . . YP(K) |

The number of positions K is determined by a mathematical requirement that the number of calculable differences exceed the number of unknowns to be solved for. An examination of equations 5 and 6 show that one TF(i) can be chosen arbitrarily. Therefore, if there are N force sensors, there are 3N-1 unknowns. Each push provides two differences, one in X and one in Y.

Thus the minimum number of pushes would be half the quantity three times the number of sensors minus 1, as set forth in equation 7.

$$K = 0.5(3N - 1) \qquad \text{Eq. 7}$$

It will be apparent that greater accuracy will result if more pushes are used.

Continuing in FIG. 2, in step 3, for each push the force sensor signals are measured and after subtracting the no-load or "offset error" signals VO(i) measured in step 1, they are tabulated.

A convenience of using a matrix notation to describe the tabulated voltages is that where V(j,i) represents the voltage from transducer i resulting from push j after subtraction of VO(i), then a partial illustrative listing can easily be constructed as in Table III.

TABLE III

| | Measured Voltages | | | |
|---|---|---|---|---|
| | TRANSDUCER | | | |
| | 1 | 2 | 3 | 4 |
| Push 1 | 23 | 5 | 9 | 2 |
| Push 2 | 7 | 16 | 14 | 4 |
| Push 3 | 34 | 9 | 8 | 2 |

Continuing in FIG. 2, in the fourth step, the differences between the calculated and the actual locations are calculated as follows. Assuming for illustration purposes that nominal values are used for the transducer properties listed in Table I, then through the use of equations 5 and 6, the calculation of push locations from each set of voltages in Table III is accomplished. These calculated coordinates may be called XC(j) and YC(j). Since the convenient matrix notation employed in the explanation heretofore has been employed, the values may be calculated in accordance with equations 8 and 9.

$$XC(j) = \sum_i TF(i)V(j,i)XT(i) / \sum_i TF(i)V(j,i) \qquad \text{Eq. 8}$$

-continued $$YC(j) = \sum_i TF(i)V(j,i)YT(i) / \sum_i TF(i)V(j,i) \qquad \text{Eq. 9}$$

Should the given transducer properties be ideal, and the positioning of the test forces and measurement of the voltages free of error, then XC(j) and YC(j) from equations 8 and 9 would be equal to the known push locations (XP(j), YP(j)). Otherwise, there will be differences EX(i) and EY(i) for each push location. These may be as described in equations 10 and 11.

$$EX(j) = XC(j) - XP(j) \qquad \text{Eq. 10}$$

$$EY(j) = YC(j) - YP(j) \qquad \text{Eq. 11}$$

There will be a list of as many differences as there are test forces or pushes. Changes are made in the assumed transducer properties during minimization efforts on EX and EY.

In accordance with the invention, an overall measure of the differences is achieved using the sum of the squares of the difference between the calculated and the known x coordinates for each calibrating test push plus the sum of the squares for the y coordinates differences, as described in connection with equation 12.

$$E = EX(j)2 + EY(j)2 \qquad \text{Eq. 12}$$

Standard mathematical procedures are known for finding transducer property values. In the case of non-linear equations such as Equations 8 and 9, iterative methods are normally required, and some care is required to ensure convergence. A number of computer programs exist for performing such calculations. One group well known in the art which is particularly effective in such cases is a variation of the approach known as "Variable Metric Minimization" and is described in an Argonne National Laboratory Report ANL-80-74 entitled "ANL-80-74 User Guide for Minpack-1, Aug. 80", available from the National Technical Information Service. The report is an overview of the algorithms, software, documentation and program listings for numerical solution of non-linear equations and least square problems.

Any mathematical method which achieves the minimum value can be used.

In applying the preferred sum of the squares technique, the general procedure is to start with an assumed set of values for the unknown parameters XT(i), YT(i) and TF(i), and to then improve these values in an iterative process. A measure of improvement would be to reduce some reasonable measure of the differences. In using the sum of the squares of the differences between the known push position and those calculated using the known values, the difference would be reduced and the process would be stopped when the improvement from step to step becomes negligible. The Variable Metric Minimization method is based on a consideration of a many-dimensioned "space" in which one "spatial coordinate" is assigned to each parameter. The method attempts, at each step in the iteration, to estimate the location of the minimum measure of "error" by considerations of the geometrical properties of such a "space", and therefore to minimize the number of iterative steps needed to achieve a particular accuracy.

The resulting parameters are then available for use when the device is in service.

What has been described is the calibration of a force sensing type data input device wherein, for as many sensors as are needed, variations in sensor output and location are compensated by a calibration method which provides a correction factor. The calibration can be applied after the device is fully assembled and in normal working order.

Having thus described our invention, what we claim as new and desire to secure by Letters Patent is:

1. An apparatus for introducing data into a data processing device said data being indicative of the position of a localized force applied to an area member supported with respect to a reference by at least three separate force sensors, the improvement comprising:

the data processing device provides at least one correction for the force sensed by each said force sensor in service, said correction being based on the minimization of the differences between coordinates of each of a plurality of known location test forces calculated with respect to the effect of said test forces on the equilibrium of said area member and actual coordinates of said test forces wherein said minimization is achieved mathematically through a procedure known as least squares.

2. The process of providing calibration information for a force sensitive input device that translates the location of a localized data input force applied to an area member coupled to a fixed member through a plurality of greater than two force sensors into data for machine computation comprising in combination the steps of:

establishing the no-load signal of each said force sensor, providing serially a test force at each of a plurality of known location test force points, the number of said plurality being at least a quantity of half the quantity three times the number of said force sensors minus one, correcting for each said test force applied to produce the output of each said force sensor by algebraically subtracting said no-load signal, establishing an indicated x and y location coordinate for each said test force by the unbalancing effect of said force on the equilibrium of said area member, establishing a difference between said indicated x and y location coordinates and the x and y coordinates of the known location of said test force, and establishing at least one correction by a minimization of the differences for each said test force between said indicated and said actual coordinates through the mathematical technique known as least squares.

3. In a force sensitive input device for translating the location of a localized data input force applied to an area member into data for machine computation, wherein said area member is supported with respect to a reference at at least three points by separate force sensors, the improvement for providing an in service essentially uniformly accurate data input force location signal independent of specific transducer response and location comprising in combination means for application of a pattern of test forces, the number of said forces being at least half the quantity three times the number of said force sensors, minus one, each said test force being positioned at a separated known location, means for determining the indicated point of application of each said test force by the effect on equilibrium conditions on said area member by sensing the output signal change from said force sensors responsive to said application of said test forces,
means for developing corrections for each said force sensor that minimize the differences between said indicated and said known locations for each test force in said pattern through the mathematical technique known as least squares and
employing said correction for each force location determination when said data input device senses a data input force in service.

* * * * *